United States Patent Office 2,946,765
Patented July 26, 1960

2,946,765
HALOGEN CONTAINING POLYMERS STABILIZED WITH A PYRAZOLE

Ernst Roos, Leverkusen, Friedrich Lober, Leverkusen-Bayerwerk, and Jürgen Koerner, Opladen, Germany, assignors to Farbenfabriken Bayer Aktiengesellschaft, Leverkusen, Germany, a corporation of Germany No Drawing. Filed Mar. 25, 1958, Ser. No. 723,666

Claims priority, application Germany Mar. 27, 1957

6 Claims. (Cl. 260—45.8)

This invention relates to the stabilization of halogen-containing polymers, and more especially to the stabilization of polymers and copolymers of halogen-containing vinyl compounds by means of a pyrazole.

It is known that halogen-containing polymers and copolymers of high molecular weight, such as for example polymers of vinyl chloride, copolymers of a preponderant quantity of vinyl chloride with vinyl acetate and also polymers and copolymers of vinylidene chloride, are so modified in an undesirable way by heat and also by the influence of light that discoloration, more especially of colorless articles, and also lowering of the mechanical properties, are produced. Since the use of elevated temperatures is required for processing the said polymers and copolymers and the products are finally also exposed to light when they are subsequently used, it is necessary to add thereto stabilizers which eliminate the discoloration and the lowering of the mechanical values of the final products.

A large number of different classes of compounds, such as amines, urea derivatives, thiourea derivatives, epoxide derivatives, 2-phenyl indole and metal salts of carboxylic acid mercaptans and others have already been proposed for this purpose.

In general, however, these stabilizers do not satisfy the requirements of simultaneously stabilizing against heat and light without giving rise to other disadvantages, such as for example the deterioration of the properties of the final products.

On the other hand, many of the known compounds are good stabilizers against the action of heat, but are ineffective against the influence of light, and vice versa.

It has now been found that a suitable class of stabilizers is the pyrazoles, more especially those of the general formula

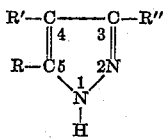

in which R, R', R" stand for substituents selected from the group consisting of hydrogen, halogen, such as chlorine, bromine, alkyl having 1 to 18, preferably 1 to 6 carbon atoms, such as methyl, ethyl, propyl, isopropyl, butyl, isobutyl, hexyl, cycloalkyl, such as cyclopentyl, cyclohexyl, aralkyl, such as benzyl, and aryl radicals, such as substituted and unsubstituted phenyl, suitable substituents being for instance halogen (chlorine, bromine), hydroxyl groups, alkyl groups (methyl, ethyl, propyl, dodecyl), alkoxy groups (methoxy, ethoxy, propoxy). Suitable compounds of the above formula are for instance pyrazole, 3-methyl-pyrazole, 3,5-dimethyl-pyrazole, 3,4,5-trimethylpyrazole, 3-propyl-5-phenyl pyrazole, 4-methyl pyrazole, 4-phenyl pyrazole, 3,4-dimethyl pyrazole, 3-phenyl-5-p-hydroxyphenyl pyrazole, 3-phenyl-5-o-hydroxy-phenyl pyrazole, 3-methyl-5-phenyl pyrazole, 3-phenyl pyrazole, 3,4-diphenyl pyrazole, 3,5-diphenyl pyrazole, 3-phenyl-5-p-methoxyphenyl pyrazole, 3-phenyl-5-p-chloro-phenyl pyrazole, 5-chloro-3-methyl pyrazole, 5-chloro-3-phenyl pyrazole.

The production of such pyrazole derivatives is known in the literature and forms for example the subject of the following publications: L. Knorr, Ber. 26 (1893), page 115; Ber. 28 (1895), page 697; O. Widman, Ber. 49 (1916), pages 481 and 2782; R. V. Rothenberg, Ber. 27 (1894), page 1097; W. Wislicenus, Ann. 379 (1911), page 256.

These compounds represent very effective heat and light stabilizers for polymers and copolymers containing halogen. Suitable polymers are more especially polymers of halogen-containing vinyl compounds such as vinyl chloride and/or vinylidene chloride, chlorobutadienes, chlorostyrenes, as well as copolymers thereof with ethylenically unsaturated monomers which are free from halogen such as vinyl esters of carboxylic acids (vinyl acetate, vinyl propionate, vinyl benzoate), esters of alpha-beta ethylenically unsaturated carboxylic acids such as alkyl acrylates (methyl acrylate, ethylacrylate, butylacrylate, allyl acrylate and the corresponding esters of methacrylic acid, maleic acid, fumaric acid), vinyl aromatic compounds (styrene, divinylbenzene, alpha-methyl styrene), dienes having 4 to 6 carbon atoms (butadiene, isoprene), ethylenically unsaturated nitriles (acrylonitrile), ethylenically unsaturated amides (amides and anilides of acrylic and methacrylic acid). The present stabilizerfs are preferably applied for the stabilization of polymers of vinylchloride and of copolymers of vinylchloride with vinylidene chloride and/or ethylenically unsaturated monomers free from halogen, in which a predominant portion, i.e. more than 50% by weight is produced from vinylchloride and/or vinylidene chloride.

The stabilizers are also effective with halogen-containing resins, in which at least part of the halogen is introduced in the preformed resin, such as chlorinated natural and synthetic rubbers, chlorinated polyvinyl chloride, chlorinated polystyrene. Instead of resins which contain chlorine there may also be used resins which contain bromine, iodine, fluorine.

The stabilizers according to the present invention are employed in the usual way, by adding them alone or in admixture with one another and/or with other stabilizers in an amount of 0.1 to 5% by weight, preferably 1 to 3% by weight, to the polymers or copolymers.

The composition to be stabilized with the present stabilizers may either be plasticized or unplasticized. As plasticizers there may be used any plasticizers known in the art. Suitable plasticizers are for instance esters of dicarboxylic acids, such as phthalic acid, adipic acid, azelaic acid, sebasic acid with aliphatic, cycloaliphatic, araliphatic alcohols having 4 to 20 carbon atoms and/or phenols (dioctylphthalate, butylbenzyl phthalate, di-(2-ethylhexyl)-phthalate, benzyloctyladipate, dioctyladipate, dioctylsebacate, dioctylacelate), phosphate esters such as triaryl phosphates, alkyl diaryl phosphates in which the alkyl group ccontains 4 to 14 carbon atoms (tricresyl phosphate, monooctyldiphenyl phosphate, hexylphenylcresyl phosphate, dodecyldiphenyl phosphate, 2-ethylhexyl-dicresyl phosphate, phenyl-di-biphenyl-phosphate). The amount of the plasticizer may be varied within wide limits depending upon the particular ester and upon the contemplated use of the composition. Usually from 10 to 100 parts of the plasticizer are used for 100 parts of halogen-containing polymer or copolymer.

The stabilizers can already be added during the polymerization when admixing the plasticizer or to the prepared polymer plasticizer mixture on the roller.

By comparison with the lead, cadmium and tin salts of organic acids and mercaptans which have been used as stabilizers, the pyrazoles according to the present invention have the advantage that they show a better compatibility with the vinyl polymers and plasticizers known in plastics art, consequently show less tendency to sweating and in addition provide polymers which are absolutely satisfactory from a physiological point of view, such as the polymers which are necessary inter alia for packing foodstuffs.

Furthermore by comparison with the heavy metals salts they are excellent because they are inert with respect to hydrogen sulphide, which in connection with the polymers prepared with stabilizers containing metal very often leads to undesirable discoloration due to formation of colored metal sulphides.

As compared with the known metal-free stabilizers, such as diphenyl thiourea and 2-phenyl indole and vinyl polymers stabilized with pyrazoles show a substantially better stability as regards discoloration due to light.

In the following examples, the parts indicated are parts by weight.

*Example 1*

60 parts of polyvinyl chloride (P.V.C.) which is obtained in known manner by the process of emulsion polymerization, are processed at 175° C. on a heated roller with 40 parts of a plasticizer consisting of equal parts of dioctyl phthalate and benzyl octyl adipate. After rolling for 5 to 10 minutes, an increasing degree of browning of the material occurs.

If 1 part of 3.5-diphenyl pyrazole is added to the mixture of the P.V.C. and the plasticizer prior to treatment, the rolled sheet remains colorless for more than 60 minutes under otherwise the same conditions.

Whereas unstabilized P.V.C. foils have only a low degree of light fastness, the foils stabilized with 3.5-diphenyl pyrazole have a substantially improved resistance to light.

By comparison with the blue scale according to DIN 53952, unstabilized P.V.C. foils show a light fastness in the region of 3, while the light fastness of foils which are stabilized with 3.5-diphenyl pyrazole shows a value higher than 5.

Similarly good results are produced when other pyrazoles are added, such as for example 3-phenyl pyrazole, 3-methyl-5-phenyl pyrazole.

*Example 2*

100 parts of polyvinyl chloride are worked on a heated roller at 175° C. without addition of plasticizer.

After a few minutes the material starts to turn very brown in color. However, if the polymer has added thereto 1 part of 3.5-diphenyl pyrazole the rolled sheet remains light in color for more than 15 minutes. The light fastness is substantially improved by this additive. Similarly good results are obtained with 3-phenyl-5-p-chlorophenyl pyrazole and with 3-phenyl-5-p-methoxyphenyl pyrazole.

We claim:

1. A novel composition comprising polyvinylchloride containing as a stabilizer 0.1–5% by weight of a pyrazole of the formula

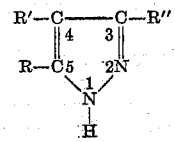

in which R, R' and R'' represent substituents selected from the group consisting of hydrogen, cyclohexyl, cyclopentyl, an alkyl group of 1 to 18 carbon atoms, phenyl, halogen-substituted phenyl, hydroxyl-substituted phenyl, alkyl-substituted phenyl, and alkoxy-substituted phenyl.

2. As a new composition, polyvinylchloride containing as a stabilizer 0.1–5% by weight of 3,5-diphenyl pyrazole.

3. As a new composition, polyvinylchloride containing as a stabilizer 0.1–5% by weight of 3-phenyl pyrazole.

4. As a new composition, polyvinylchloride containing as a stabilizer 0.1–5% by weight of 3-methyl-5-phenyl pyrazole.

5. As a new composition, polyvinylchloride containing as a stabilizer 0.1–5% by weight of 3-phenyl-5-parachlorophenyl pyrazole.

6. As a new composition, polyvinylchloride containing as a stabilizer 0.1–5% by weight of 3-phenyl-5-paramethoxyphenyl pyrazole.

References Cited in the file of this patent

UNITED STATES PATENTS

| | | |
|---|---|---|
| 1,879,210 | Hahl | Sept. 27, 1932 |
| 2,458,780 | Howland | Jan. 11, 1949 |